United States Patent [19]

Shaw et al.

[11] Patent Number: 5,052,864
[45] Date of Patent: Oct. 1, 1991

[54] COUNTERBORE MILLING CUTTER

[75] Inventors: Jerry L. Shaw, Drayton Plains; Stanley R. Mickel, Ortonville, both of Mich.

[73] Assignee: GTE Valenite Corporation, Troy, Mich.

[21] Appl. No.: 274,066

[22] Filed: Nov. 21, 1988

[51] Int. Cl.$^5$ ............................................. B23B 51/00
[52] U.S. Cl. ...................................... 408/201; 408/82; 408/713
[58] Field of Search ............... 408/201, 200, 231, 233, 408/713, 118, 196, 199, 82, 225, 188; 407/42, 51, 46; 82/1.4

[56] References Cited

U.S. PATENT DOCUMENTS

| | | | |
|---|---|---|---|
| 3,276,293 | 10/1966 | Testa | 408/200 |
| 3,358,531 | 12/1967 | Schaffler | 408/221 |
| 4,230,429 | 10/1980 | Eckle | 408/713 X |
| 4,265,574 | 5/1981 | Eckle | 408/713 X |
| 4,303,358 | 12/1981 | Grusa | 408/713 X |
| 4,393,735 | 7/1983 | Eckle | 407/46 X |
| 4,606,680 | 8/1986 | Striegl | 408/233 X |
| 4,693,641 | 9/1987 | Tsujimura et al. | 408/713 X |
| 4,714,390 | 12/1987 | Eckle et al. | 409/234 |

Primary Examiner—Larry I. Schwartz
Assistant Examiner—Robert Schultz
Attorney, Agent, or Firm—Bill C. Panagos

[57] ABSTRACT

Counterbore milling cutter employing Trigon inserts mounted with the active cutting edge extending radially to provide right angle counterbore corners with 84° included angle cutting points for greater strength and support than possible with conventional triangular inserts. A pair of pocket shoulders at the end of the body adjacent a pilot extension locate each insert held by a central screw offset toward the pocket shoulders, preferably configured to best resist torque imposed by axial force against the cutting edge.

9 Claims, 1 Drawing Sheet

COUNTERBORE MILLING CUTTER

BACKGROUND OF THE INVENTION

The invention relates to a tool for counterboring, a clearance hole such as a drilled and tapped hole, for the head of a bolt as required to be recessed below the top plane of the part. The drilled hole is normally counterbored to a depth at least equal to the thickness of the head of the bolt or cap screw. Conventional tools are available for such application classified as counterbore cutters. Early art includes solid high speed cutters, also with carbide braised in place.

The present invention is more particularly directed to counterbore cutters employing indexable inserts. Such cutters are known in the art which include the use of small I.C. 60° included triangles positioned to provide a plurality of cutting edges. In order to provide square corners at the bottom of the counterbore, the active cutting edge is positioned in a substantially radial line with a corner extending to the radius of the counterbore. Pockets for such inserts in the counterbore tool include two shoulders for engaging the sides of the insert for the inactive cutting edges. Conventional central holddown screws are offset to force the insert against such shoulders.

"Trigon" tool inserts are known in the art which are six sided, having three cutting corners, each with an 84° included angle, as distinguished from a 60° angle of a conventional triangle insert. As employed in drilling, the insert is positioned with the cutting point and center of the insert in a substantially axial line for the drill so that the active cutting edge extends at a positive radial rake angle of 6°.

BRIEF DESCRIPTION OF THE PRESENT INVENTION

A Trigon drilling insert in the present disclosure has been adapted to a counterboring tool for cutting square shoulders by providing one or more insert pockets at the juncture of a pilot extension with a tool body having substantially the counterbore diameter. Each pocket positions the insert with its active cutting edge extending in a substantially radial direction s that a clearance angle of only 6° for the outer adjacent cutting edge provides additional and more rigid support of the cutting point, having an 84° included angle, compared to the conventional triangular inserts having a 60° included angle and 30° clearance angle.

In one embodiment, a 30° angle is formed by a retaining wall and an imaginary line parallel to the cutter body axis. The included angle is provided at the outer perimeter of the insert pocket with a complementary inner retaining wall disposed at a 60° included angle also relative to an imaginary line parallel to the tool axis. However, in a preferred second embodiment, such outer retaining wall is omitted and a pair of inner retaining walls are provided, again with 60° relative included angle, which are better adapted to resist the torque arising from axial cutting force imposed on the active cutting edge.

DETAILED DESCRIPTION OF FIRST EMBODIMENT

Figure 1:
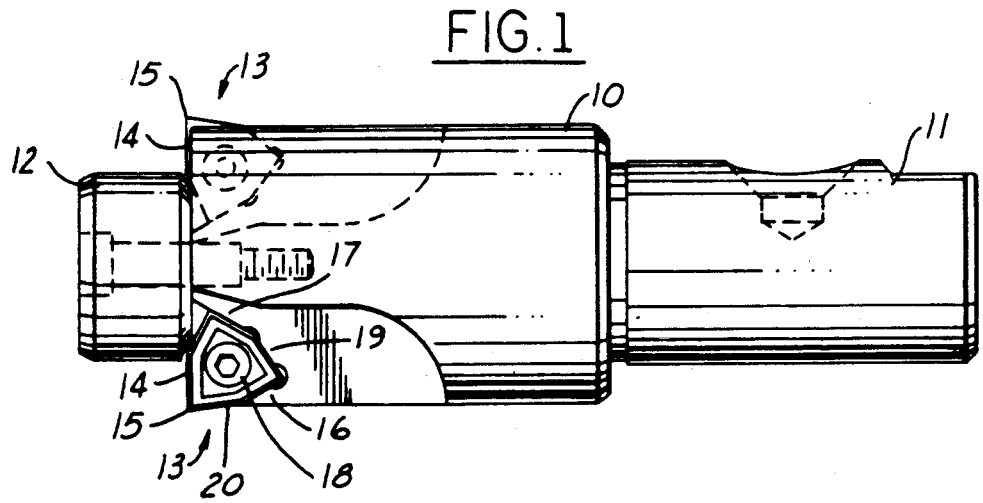
FIG. 1 is a side elevation of a first embodiment of a counterbore milling cutter employing Trigon inserts.

With reference to FIG. 1, the counterbore milling cutter of the present invention comprises a body 10, shank 11, pilot 12, a pair of Trigon inserts 13 mounted with active cutting edges 14 extending radially to terminal point extremities 15 establishing the effective counterbore diameter.

Figure 5:
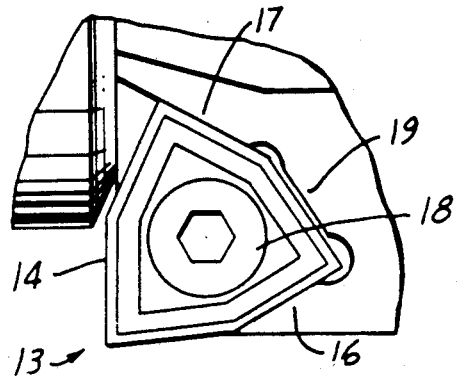
FIG. 5 is an enlarged fragmentary view of a typical pocket configuration for the insert f the first embodiment.

A pocket for each insert includes a 30° no outer locating wall 16 and inner locating wall 17 disposed at a relative 60° included angle, both angles formed with respect to an imaginary line parallel to the rotational axis of the cutting body, with central holddown screw 18 offset to force the insert in a direction bisecting the respective locating walls 16 and 17. Clearance is provided in the intermediate wall adjacent inactive cutting edge 19, as best shown in FIG. 5.

The 84° included angle and the cutting point between active cutting edge 14 and clearance edge 20 extending at a 6° clearance angle provide relatively greater strength in the insert and its body support that is possible with a conventional triangular insert of prior art counterbore cutters. The flat bottom insert support extending substantially under the extremities of the cutting point, together with the moat/raised island chip breaker of the Trigon insert in conjunction with the strong corner allows for significantly heavier feed rates than possible with the simple triangular configuration. Additionally, the geometry of the design with 0° axial and 0° radial rake, in conjunction with the Trigon chip breaker, provide productive application and variety of workpiece materials from soft ductiles, plain and alloy steel, stainless steels to low Youngs modulus aerospace alloys while maintaining chip control which allows for shorter gullets, also contributing to a stronger tool. While illustrated as applied to an integral shank end mill, it will be understood to those skilled in the art, that the concept may also be applied to shell mill construction fixturing the pilot and counterbore with differential screws and socket head screws where size allows. With use of 0.1875" I.C. Trigon inserts, counterbore milling cutter ranges can be employed for much smaller diameters than previously attainable.

Figure 4:
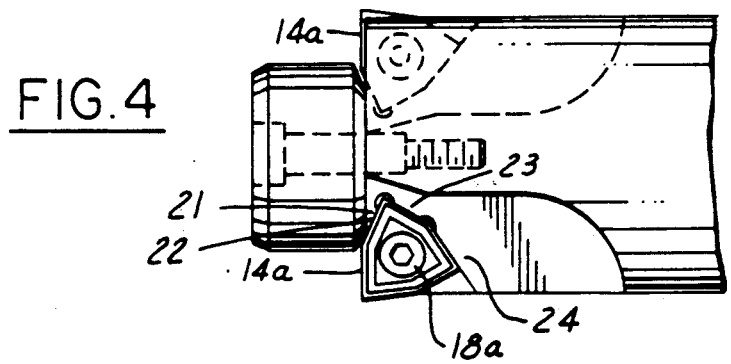
FIG. 4 is a fragmentary view of a modified preferred embodiment of the milling cutter.
Figure 2:
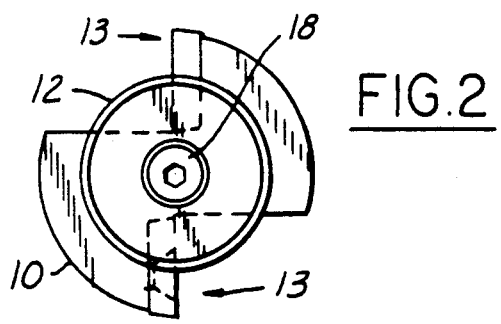
FIG. 2 is an end view of the milling cutter.
Figure 3:
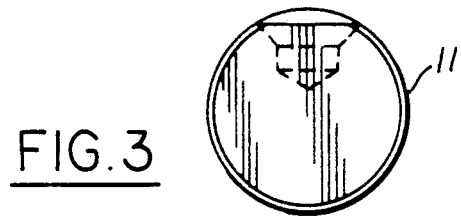
FIG. 3 is an end view of the shank of the milling cutter.
Figure 6:
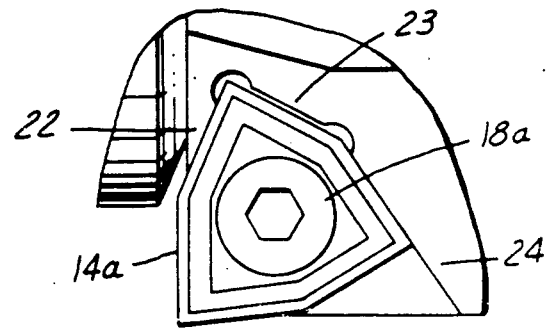
FIG. 6 is an enlarged fragmentary view of the pocket configuration for the preferred second embodiment.

With comparative reference to FIGS. 1 and 4, the preferred embodiment FIG. 4 eliminates shoulder 16 of FIG. 1, adds shoulder 21 for registration of side 24, and transfers registration from side 23 to side 24 providing slight clearance for side 23 as more clearly shown in the enlarged view of FIG. 6. In the preferred embodiment, screw 18a is offset in the direction bisecting the angle between sides 22 and 24 so that the axial cutting force on cutting edge 14a creating counterclockwise torque on the insert, will be more effectively resisted than by walls of the pocket in the first embodiment.

FIG. 1 illustrates the use of a left handed screw for a right-hand cutter and a right-hand screw for a left-hand cutter.

FIG. 4 illustrates a preferred embodiment where a right-hand screw is used for a right-hand cutter and a left-hand screw is used for a left hand-cutter.

We claim:

1. A counterbore milling cutter comprising a cylindrical body having a counterbore clearance diameter, said body rotatable about a centrally disposed axis and separated by a shank at one end and a pilot at another end.
   a plurality of pockets adjacent the pilot end of the body,
   a plurality of insert means having three symmetrically disposed insert points separated by straight side edges, each of said points having an included angle in a range less than 90° and greater than 60° forming six sides intersecting in pairs to form three obtuse angles,
   said inserts being secured within said pockets so to extend one of said side edges radially with respect to said axis so that an active cutting edge of one of said side edges is substantially coincident with the radial extent of the counterbore.

2. A counterbore milling cutter of claim 1 wherein said included angle is approximately 84°.

3. The counterbore milling cutter of claim 2 wherein said insert pockets have two shoulder walls, one of said walls defined by a 30° outer wall, and the other of said walls being defined by an inner locating wall disposed at a 60° angle relative to said insert cutting edge for insert side wall engagement.

4. A counterbore milling cutter of claim 3 including an insert holddown screw offset in a direction between said two shoulder walls, substantially bisecting the included angle formed by said shoulder walls.

5. A counterbore milling cutter of claim 2 including an insert pocket having two locating shoulder walls disposed at a relative 60° included angle for insert side wall engagement wherein one of said locating walls is engaged by an insert side wall radially inward and adjacent the side wall of said active cutting edge.

6. A counterbore milling cutter of claim 5 including a central holddown screw offset in a direction substantially bisecting the included angle between said locating walls,
   said screw being right-handed for right-hand cutting and left-handed for left-hand cutting.

7. Counterbore milling cutter of claim 2 wherein said insert means is located to provide zero radial and zero axial rake.

8. Counterbore milling cutter of claim 2 including a flat pocket insert seat extending parallel to a radial axial plane.

9. A counterbore milling cutter of claim 2 wherein said plurality of insert means comprises a pair of cutter inserts with flat radial pocket seats in said body extending parallel to a common radial plane.

* * * * *